(12) United States Patent
Li

(10) Patent No.: US 6,215,767 B1
(45) Date of Patent: Apr. 10, 2001

(54) QUALITY OF SERVICE ADJUSTMENT AND TRAFFIC SHAPING ON A MULTIPLE ACCESS NETWORK

(75) Inventor: Chia-Chang Li, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/845,298

(22) Filed: Apr. 25, 1997

(51) Int. Cl.⁷ ..................................................... G01R 31/08
(52) U.S. Cl. ......................... 370/230; 370/252; 370/412
(58) Field of Search ................... 370/252, 508, 370/507, 519, 230, 412, 474, 231, 235, 239, 468

(56) References Cited

U.S. PATENT DOCUMENTS 5,483,677 * 1/1996 Brydon ................................ 455/67.6
5,790,543 * 8/1998 Cloutier ................................ 370/395

* cited by examiner

Primary Examiner—Chau Nguyen
Assistant Examiner—Thinh Vu

(57) ABSTRACT

A delivery time differential is computed between an intended transmission time of a cell and a time that the same cell is successfully transmitted on a multiple access network. The delivery time differential is communicated from the client terminal, where it is initially calculated, to the host terminal side, which utilizes the delivery time differential to compensate for the time distortions resulting from multiple end-user devices accessing shared bandwidth on the multiple access network.

22 Claims, 6 Drawing Sheets

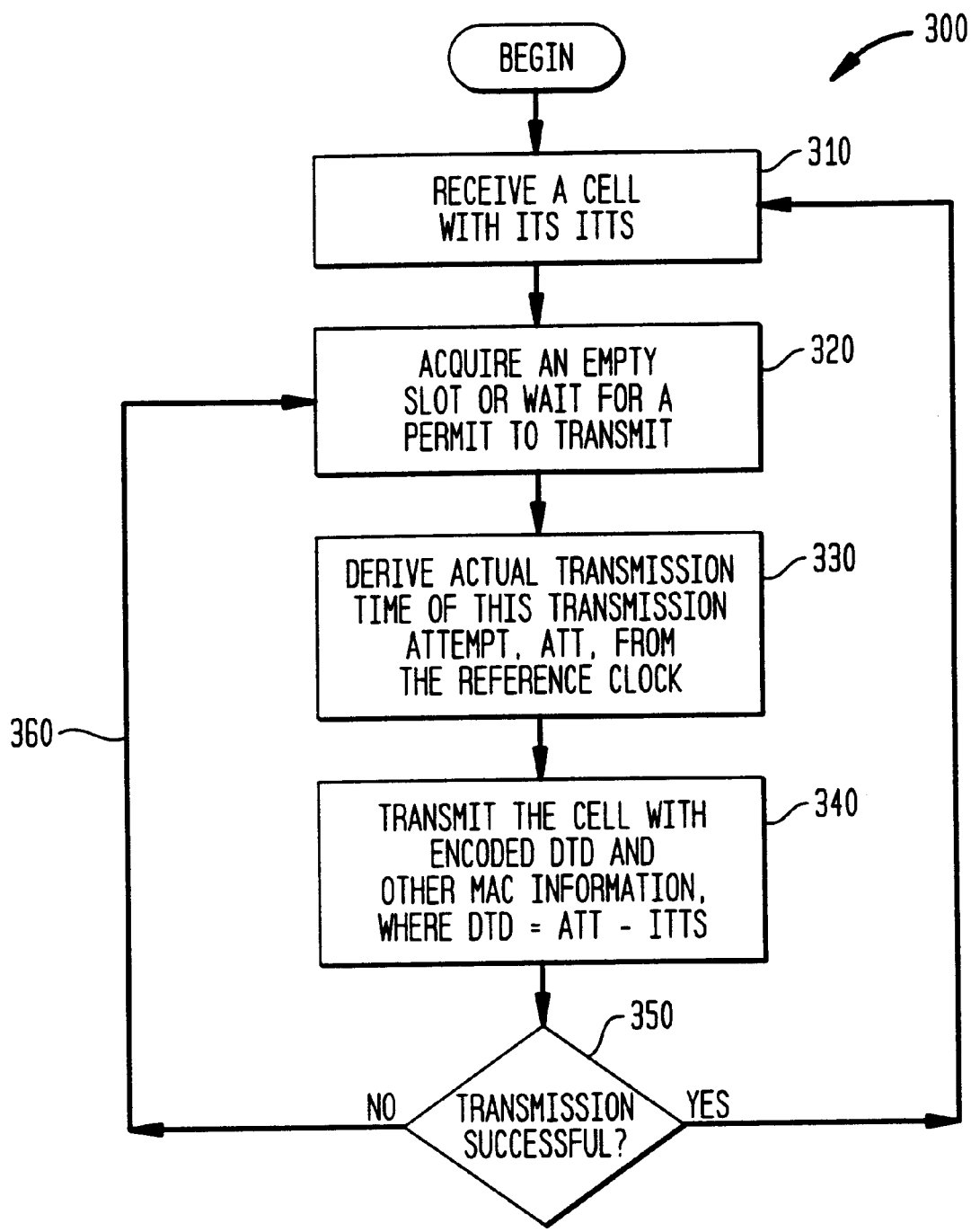

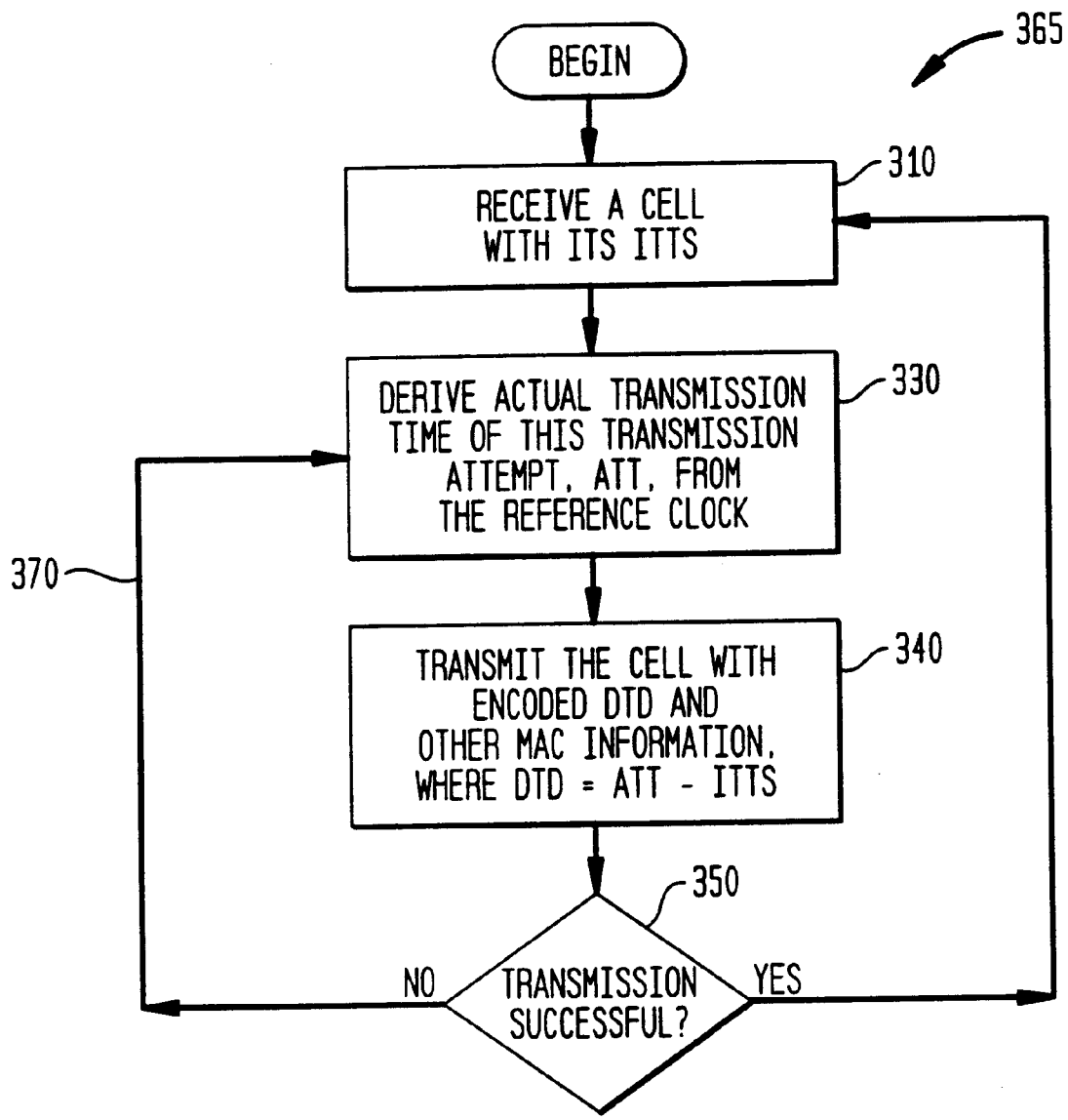

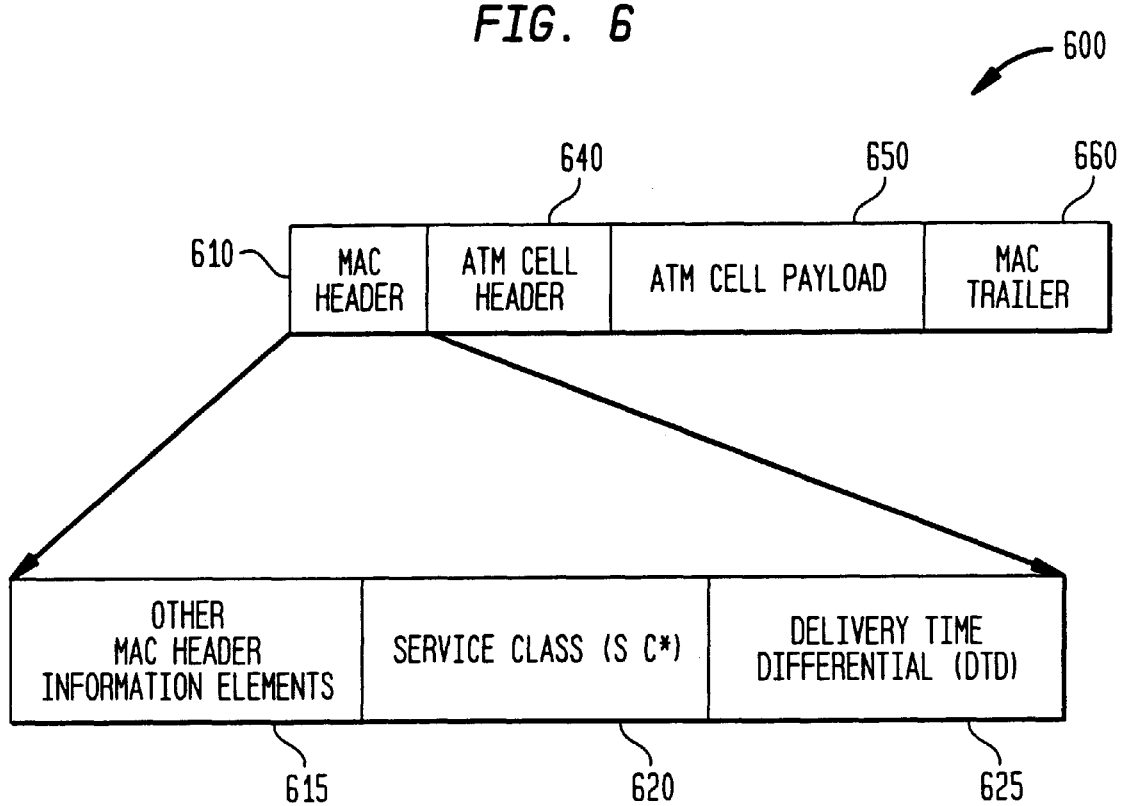

QUALITY OF SERVICE ADJUSTMENT AND TRAFFIC SHAPING ON A MULTIPLE ACCESS NETWORK

FIELD OF THE INVENTION

This invention relates to the field of telecommunications and in particular, to packet-based communications on multiple access networks.

BACKGROUND OF THE INVENTION

Asynchronous Transfer Mode ("ATM") is a networking protocol designed to support high speed digital voice and data communications. It is generally believed that within the next several years, most of the voice and data traffic generated throughout the world will be transmitted by ATM technology. Broadband packet networks based on ATM technology are enabling the integration of traffic having a wide range of characteristics within a single communications network. In order to be accepted by potential end users and communication network providers, these ATM based broadband networks must meet certain performance requirements.

In general, an ATM bearer service, e.g., the broadband network, provides a sequence-preserving, connection-oriented cell transfer service between a source and destination with an agreed upon Quality of Service ("QoS") and throughput. That is, the underlying layers of the ATM protocol should provide the convergence and transmission functions that would preserve the traffic shape and QoS of the traffic as the ATM cells are passed between the ATM layer and the underlying layers. Although the prior art discusses in great detail how these convergence and transmission functions are supported on a point-to-point medium, e.g., 155.52 Mbps on Synchronous Optical Network ("SONET"), 52 Mbps on Unshielded Twisted Pair ("UTP"), and 155 Mbps on fiber optic networks, etc., the prior art does not discuss how these same functions can be supported on multiple access networks.

In point-to-point medium systems, at connection set-up time, an end-user device negotiates with the network, at the network layer, certain QoS parameters, e.g., Cell Delay Variation ("CDV"), Cell Loss Priority ("CLP"), etc., and traffic descriptors according to the types of connection, e.g., circuit emulation, real-time video and audio, connection-oriented data transfer, connectionless data transfer, etc. Assuming a point-to-point connection at the User-Network Interface ("UNI"), the insertion of a cell for a particular connection is scheduled by the ATM layer and hence can be done completely under the control of the end-user device, following the negotiated contract with the network.

However, if the end-user device is attached to a multiple access network, such as a Hybrid Fiber/Coaxial network ("HFC") or a Switched Digital Video ("SDV") network, where multiple end-user devices access shared bandwidth, the traffic shape and QoS parameters may be temporally distorted at the insertion time as a result of bandwidth contention on the access network. Accordingly, there is a need to provide a simple and effective method which mitigates the effect of bandwidth contention on the shape of traffic and QoS parameters.

SUMMARY OF THE INVENTION

The present invention teaches a method and apparatus which mitigates the effects of bandwidth contention on the QoS and traffic shape on a multiple access network by temporally adjusting the delivery time of the cell. This method properly supports the convergence and transmission functions on a multiple access medium, such as a HFC network or the shared coaxial segment of a SDV network. Importantly, the present invention can be employed with any packet-based network, e.g., the Internet.

In an exemplary embodiment of the present method, a delivery time differential is computed between the intended transmission time of a cell and the time that the same cell is successfully transmitted on a multiple access network. The delivery time differential is communicated from the client terminal, where it is initially calculated, to the lost terminal side, which utilizes the delivery time differential to compensate for the time distortions resulting from multiple end-user devices accessing shared bandwidth on the multiple access network.

Advantageously, the method and apparatus of the present invention can be utilized with any mechanism employed for access to multiple access networks, e.g., contention-based mechanisms, permit-issuing or token-passing schemes. The above factors make the present invention a versatile and efficient method for maintaining the QoS and shape of traffic on a multiple access medium.

BRIEF DESCRIPTION OF THE DRAWINGS

A more complete understanding of the present invention may be obtained from consideration of the following description in conjunction with the drawings in which:

FIG. 3(a) is a functional flowchart of a delivery time differential calibration process in accordance with the method of the present invention using a token-based slot acquisition method;

FIG. 3(b) is a functional flowchart of a delivery time differential calibration process in accordance with the method of the present invention using a contention-based slot acquisition method;

FIG. 6 is a medium access control protocol data unit in accordance with the present invention.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 2–5 may be provided by a single shared processor. (Use of the term "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

In general, the present invention mitigates the effects of bandwidth contention on the QoS and traffic shape by temporally adjusting the delivery time of the cell. A delivery time differential is computed between the intended transmission time of a cell and the time that the same cell is successfully transmitted on a multiple access network. The delivery time differential is communicated from the client terminal, where it is initially calculated, to the host terminal side, which utilizes the delivery time differential to compensate for the time distortions resulting from multiple end-user devices accessing shared bandwidth on the multiple access network. The present invention can be utilized in conjunction with contention-based mechanisms, permit-issuing or token-passing schemes for accessing multiple access networks. The present invention is applicable to packet-based networks, such as an HFC network, the shared coaxial segment of an SDV network or the Internet.

Figure 1:
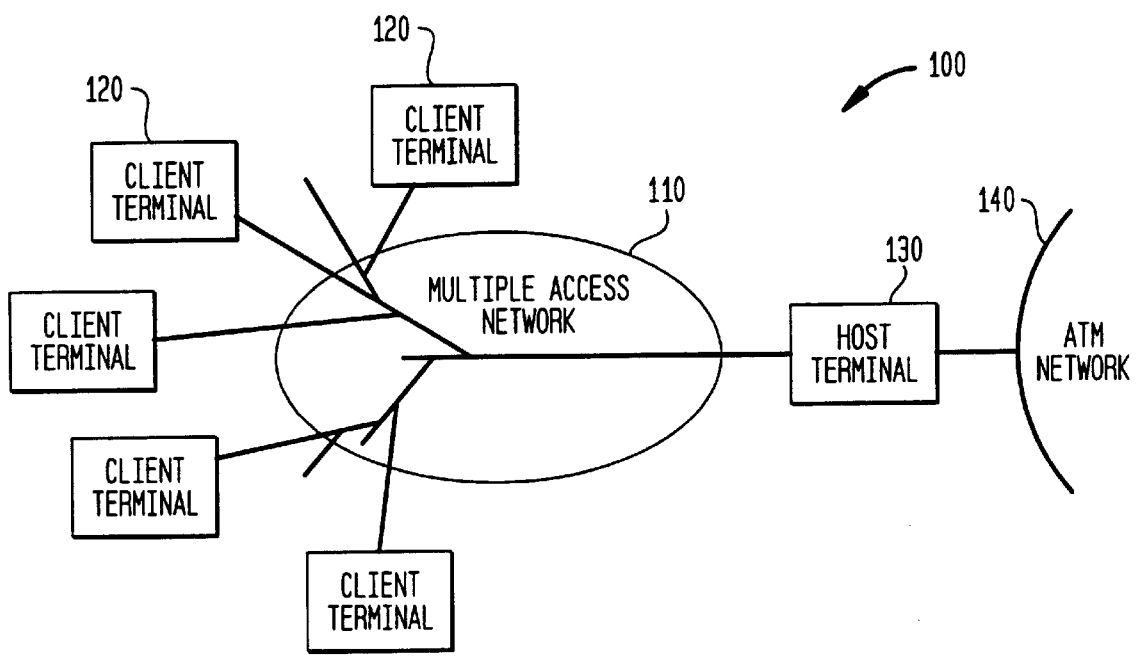
FIG. 1 is an exemplary embodiment of a multiple access network which utilizes the method of the present invention.

FIG. 1 illustrates an exemplary telecommunications system 100 with which the present invention may be utilized. System 100 consists of a multiple access network 110, which permits client terminals 120 to communicate with a host terminal 130, which in turn serves as a gateway to an Asynchronous Transfer Mode ("ATM") network 140. Although network 100 is shown with a tree-and-branch topology, which represents a typical configuration of a HFC network in a broadband environment, the method of the present invention is equally applicable to other network topologies and configurations. For purposes of clarity, means for connecting the elements of system 100 are not detailed as they would be well understood to one skilled in the art.

An ATM bearer service provides a sequence-preserving, connection-oriented cell transfer service between an end-user and the network with an agreed Quality of Service and throughput. The end-user negotiates with the bearer service, at connection set-up time, the QoS parameters and traffic descriptors required for the call. These QoS parameters include Cell Delay Variation, Cell Loss Priority, etc., and traffic descriptors related to the type of connection, e.g., circuit emulation, real-time video and audio, connection-oriented data transfer, connectionless data transfer, etc. As such, it is imperative that the underlying layers provide the convergence and transmission functions that would preserve the shape and QoS of the traffic as the cells are passed from the ATM layer to the underlying layers.

In a point-to-point connection at the User-Network Interface ("UNI"), the cell insertion of a particular connection is scheduled by the ATM layer and hence can be done completely under the control of the end-user (or client terminal 120), following the contract with the network. That is, normal cell delay factors are already accounted for in the above configuration. In contrast, if client terminal 120 is attached to multiple access network 110, where multiple client terminals 120 access a shared bandwidth, delays may result in the insertion of the cell as a result of bandwidth contention on multiple access network 110. This additional temporal delay due to bandwidth contention affects the shape of the traffic and QoS parameters at cell insertion time since it has not been accounted for by the underlying ATM protocol.

The method and apparatus of the present invention mitigates the effect of bandwidth contention on the shape of traffic and QoS parameters by introducing the concept of delivery time differential ("DTD") into the ATM protocol at the media access control ("MAC") sublayer. The basic concept of DTD is to calibrate (on the client terminal side) and compensate (on the host terminal side) at the MAC sublayer, the difference between the intended transmission time of a cell, i.e., an ATM protocol data unit ("ATM_PDU"), when it is passed to the MAC sublayer and the time that the same cell is successfully transmitted on multiple access network 110. Although DTD can be defined in many different ways with slight variations between them, the following is generalized definition of DTD: DTD is the temporal difference between the time that the last bit of an ATM_PDU is received by the MAC sublayer device and the time the last bit of the corresponding MAC_PDU is successfully passed to the physical layer device.

Figure 2:
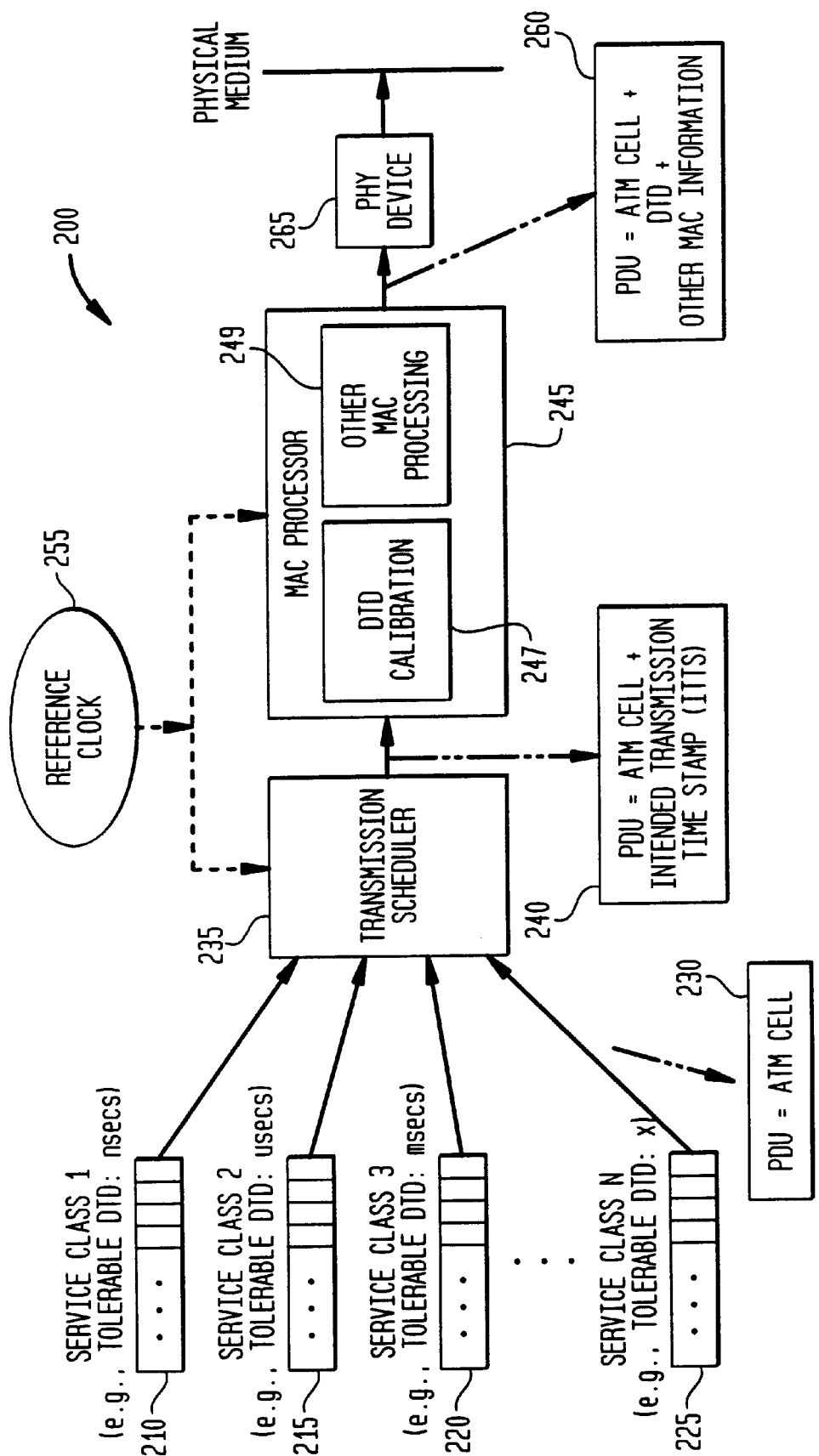
FIG. 2 is an exemplary embodiment of a client terminal in accordance with the present invention.

FIG. 2 illustrates an exemplary embodiment of a DTD calibration function, which resides in a client terminal 220 transmission process. In order to satisfy the requirements of multiple applications, multiple virtual channel's are set up in client terminal 220 with different QoS parameters and traffic descriptors. The traffic generated by these applications are put into different Service Class queues 210–225, depending upon their QoS parameters and traffic descriptors. One of the possible criteria for service classification is the range of tolerable DTD, e.g., in nanoseconds, or milliseconds, etc. That is, each Service Class would correspond to the amount of delay that could be tolerated by the specific traffic being handled without changing the QoS parameters or traffic shape. Note that there could also exist a Service Class which could be unconcerned with the amount of delay, as long as the information is eventually sent to the destination party. That is, a Service Class with an infinite tolerable DTD.

PDUs 230 in the queues are retrieved by a transmission scheduler 235, which time stamps an Intended Transmission Time Stamp ("ITTS") on each of PDUs 235 to form PDUs 240. PDUs 240 are then sent to a MAC processor 245, which includes a DTD Calibration processor 247 and a MAC processing unit 249. A reference clock 255 is fed to both transmission scheduler 235 and MAC processor 245 for the reasons shown below. As detailed below, MAC processor 245 uses a combination of well-known MAC mechanisms, e.g., Carrier Sense Multiple Access with Collision Detection ("CSMA/CD") or ADAPt, and DTD Calibration processor 247 for the eventual, successful transmission of the PDUs 260 through a physical layer device 265.

The process of how DTD is calculated and encoded as part of the MAC processing is now explained with respect to FIG. 2 and token-based slot acquisition flowchart 300 of FIG. 3(a) and contention-based flowchart 365 of FIG. 3(b). MAC processor 245 will receive PDUs 240 from transmission scheduler 235 with an ITTS stamp (block 310). MAC processor 245 will then attempt to access the multiple access network using a contention-based, token passing or other similar accessing methods (block 320). As shown below, the choice of accessing method determines which retransmit path is taken if the transmission is unsuccessful. DTD Calibration processor will then derive the actual transmission time ("ATT") of this transmission attempt from reference clock 255 (block 330). A DTD is then calculated by subtracting the ITTS from the ATT, i.e., DTD=ATT−ITTS (block 330). The DTD is then encoded, along with other MAC processing information, to generate PDUs 260, which are sent to physical device 265 for transmission out to the network (block 330). Retransmission of the specific information is attempted if the original transmission was unsuccessful (block 350) and ATT and DTD are recalculated accordingly.

As mentioned above, the retransmission path taken is dependent upon the accessing mechanism used by MAC processor 245. If a contention-based mechanism was employed on multiple access network 110, such as slotted ALOHA, a transmitted cell may experience collision, thus resulting in an unsuccessful transmission. Client terminal 120 re-attempts the above mentioned MAC functions and modifies the DTD accordingly. The resulting new DTD is now the sum of the old DTD plus the additional MAC processing time. The process is repeated until the cell is successfully transmitted with the final DTD encoded as shown in FIG. 3(*b*) by retransmit path 370. If access to multiple access network 110 is achieved using a permit-issuing or token-passing scheme, then the DTD has to be encoded only when the client terminal receives a permit or token to transmit. This is represented by retransmit path 370 in FIG. 3(*a*).

Figure 4:
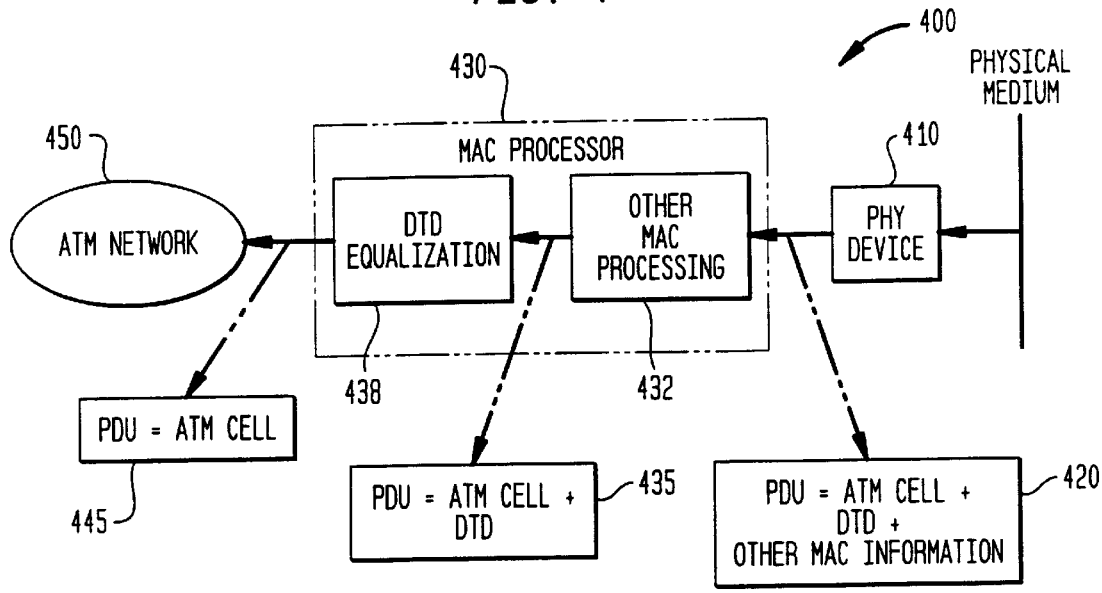
FIG. 4 is an exemplary embodiment of a host terminal in accordance with the present invention.
Figure 5:
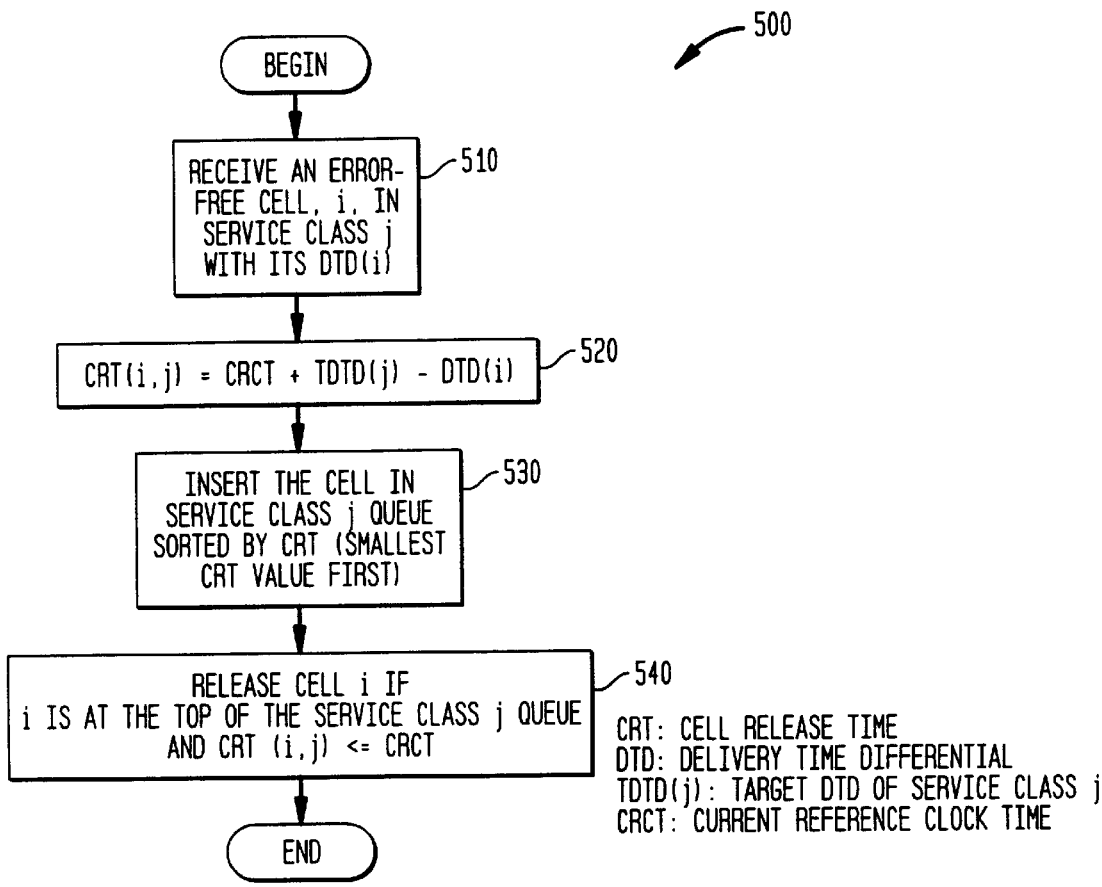
FIG. 5 is a functional flowchart of a delivery time differential equalization process in accordance with the method of the present invention.

Referring now to FIGS. 4 and 5, the host terminal DTD equalization process is explained. As shown in FIG. 4, the structure and function of host terminal 400 is similar to that of client terminal 200. In general, when host terminal 400 successfully receives a PDU with an ATM cell by means of other MAC sublayer processing, a DTD equalization process is applied to adjust the temporal distance between cells before they are released to the ATM network. Host terminal 400 includes a physical device 410 for receiving a transmitted PDU 420, and forwarding same to MAC processor 430, which consists of MAC processing unit 432 and DTD Equalization processor 438. MAC processor 430 forwards the DTD equalized PDU 445 to ATM network 450. As a consequence, the original information suffers no temporal distortion due to bandwidth contention on the multiple access network.

Referring to FIG. 4 in conjunction with flowchart 500 of FIG. 5, the process of DTD equalization is explained. Once MAC processor 430 receives a PDU 420, the normal MAC processing information is attended to by MAC processing unit 432, which then forwards PDU 435 to DTD Equalization processor 438. Processor 438 initially determines which Service Class the error free cell i belongs in and what the DTD is of cell i (block 510). A Cell Release Time ("CRT") is then calculated by processor 438:

$$CRT(i,j)=CRCT+TDTD(j)-DTD(j)$$

where CRCT is the current reference clock time, and TDT(j) is the target DTD of Service Class j (block 520). The cell i is then inserted into the Service Class j queue, which is sorted by smallest CRT value first (block 530). Cell i is released from Service Class j if cell i is at the top of the queue and the cell release time for cell i is less than or equal to the current reference clock time. As is evident, any delays which may arise due to bandwidth contention are therefore mitigated or accounted for by the method and apparatus of the present invention.

As explained above, the exemplary embodiment of DTD Calibration processor 247 and Equalization processor 438 are considered as part of the MAC sublayer processing. As a consequence, the PDU must include the necessary information for communicating the DTD value between a client terminal and a host terminal. Referring to FIG. 6, an exemplary embodiment of a PDU 600, which could achieve the above requirements, is illustrated. PDU 600 includes a MAC header 610, an ATM cell header 640, an ATM cell payload field 650 and a MAC trailer 660. MAC header 610 further includes normal MAC information 615, a Service Class ("SC") field 620 and a DTD field 625. In this particular example, the concept of Service Class is tightly coupled or associated with the range of tolerable DTD, which was discussed previously. As such, SC field 620 is also used to convey the unit information of DTD, so as to enable efficient coding of the overall DTD information. That is, SC1 could correspond to DTD units of 10 $\mu$secs, SC2 could equal 100 $\mu$secs and SC3 could equal 1 msec. However, depending on the definition utilized in the system, SC 620 may or may not be directly related to DTD units. Where SC and tolerable DTD are not as defined as above, the coding of overall DTD information would be different.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for mitigating the effects of bandwidth contention on the transmission of cells in a multiple access network, said method comprising the steps of:

computing a delivery time differential at a client terminal unit, said delivery time differential being the difference between an intended transmission time of each of said cells and an actual successful transmission time of each of said cells;

communicating said delivery time differential of each of said cells to a host terminal unit; and utilizing said delivery time differential to compensate for temporal distortions occurring between said cells, said temporal distortions resulting from multiple users accessing said multiple access network.

2. The method according to claim 1, including the step of establishing at least one service class queue, each said service class queue representing different Quality of Service and traffic descriptors.

3. The method according to claim 2, wherein each said service class queue further represents a range of tolerable delivery time differentials.

4. The method according to claim 1, wherein said step of computing includes the steps of:

receiving each of said cells from a service class queue with an intended transmission time stamp;

deriving an actual transmission time from a reference clock in response to acquiring access on said multiple access network; and calculating said delivery time differential by subtracting said intended transmission time stamp from said actual transmission time.

5. The method according to claim 4, wherein the step of communicating includes the steps of:

acquiring access on said multiple access network in response to receiving each of said cells from a corresponding one of said service class queue;

encoding each of said cells with said delivery time differential; and transmitting each of said cells over said multiple access network to said host terminal unit.

6. The method according to claim 5, wherein said step of utilizing includes the steps of:

verifying that each of said cells received from said client terminal unit is error-free;

calculating a cell release time for each of said cells;

inserting each of said cells in an associated service class queue by said cell release time; and releasing each of said cells into an asynchronous transport network when each of said cells is at a top of said associated service class queue and said cell release time of each of said cells is less than or equal to a current reference clock time.

7. The method according to claim 6, wherein said step of calculating a cell release time is achieved by subtracting said delivery time differential of each of said cells from a summation of a current reference clock time with a target delivery time differential value for said associated service class queue.

8. The method according to claim 1, wherein:

said step of computing includes the steps of:

receiving each of said cells with an intended transmission time stamp;

deriving an actual transmission time from a reference clock in response to acquiring access on said multiple access network;

calculating said delivery time differential by subtracting said intended transmission time stamp from said actual transmission time;

said step of communicating includes the steps of:

acquiring access on said multiple access network in response to receiving each of said cells with said time stamp;

transmitting each of said cells with an encoded delivery time differential over said multiple access network to said host terminal unit;

said step of utilizing includes the steps of:

calculating a cell release time for each of said cells that were received error-free; and releasing each of said cells into an asynchronous transport network when each of said cells is at a top of an associated service class queue and said cell release time of each of said cells is less than or equal to a current reference clock time.

9. The method according to claim 1, further including the step of retransmitting each of said cells that was determined by said host terminal unit to have an error.

10. The method according to claim 9, wherein said step of retransmitting includes the steps of:

calculating a new value of said delivery time differential;

transmitting each of said cells received in error by said host terminal unit; and repeating said steps of calculating and transmitting until each of said cells is successfully received error-free by said host terminal unit.

11. The method according to claim 10, wherein said delivery time differential is calculated by summing a previous value of said delivery time differential with additional processing time.

12. The method according to claim 10, wherein said delivery time differential is calculated by subtracting said intended transmission time from a new actual transmission time.

13. The method according to claim 9, wherein said step of retransmitting repeats the steps of computing a delivery time differential, communicating said delivery time differential and utilizing said delivery time differential until each of said cells is successfully transmitted to said host terminal unit.

14. The method according to claim 1, wherein said step of communicating includes the step of constructing a protocol data unit which includes a service class element and a delivery time differential element in a header portion of said protocol data unit.

15. A system which accounts for temporal distortions in transmitting cells over a multiple access network, said system comprising:

at least one client terminal unit for computing a delivery time differential between an intended transmission time of each of said cells and an actual successful transmission time of each of said cells;

a host terminal unit coupled with said at least one client terminal unit;

said at least one client terminal unit transmitting each of said cells to said host terminal unit; and said host terminal unit compensating for said temporal distortions between each of said cells by utilizing said delivery time differential to meet quality of service parameters and traffic shape characteristics.

16. The system according to claim 15, wherein said at least one client terminal unit includes:

a delivery time differential calibrator for calculating said delivery time differential; and said host terminal unit includes a delivery time differential equalizer for adjusting a temporal distance between said cells using said delivery time differential.

17. The system according to claim 15, wherein said at least one client terminal unit includes:

a plurality of virtual channels representing a range of tolerable delivery time differentials within which each of said cells must be delivered to said host terminal unit, each of said virtual channels identified by a service class and having a service class queue for holding each of said cells;

a transmission scheduler for removing each of said cells from said service class queue and placing an intended transmission time stamp on each of said cells;

a media access controller for accessing said multiple access network, wherein an actual transmission time relates to when access has been acquired to said multiple access network;

said media access controller having a delivery time differential calibrator for subtracting said intended transmission time stamp from an actual transmission time to calculate said delivery time differential; and said controller encoding each of said cells with said delivery time differential and transmitting each of said cells to said host terminal unit.

18. The system according to claim 17, wherein said host terminal unit includes:

an associated set of service class queues corresponding to those in said client terminal unit;

a media access controller for processing each of said cells received from said client terminal unit;

said media access controller including a delivery time differential equalizer for calculating a cell release time based on said delivery time differential;

said calibrator inserting each of said cells in an associated service class in accordance with said cell release time; and said media access controller releasing each of said cells when each of said cells is at a top of said service class queue and said cell release time is less than or equal to a clock reference time.

19. The system according to claim 15, wherein:

said host terminal unit verifies that each of said cells received is error-free; and said at least one client terminal unit retransmits each of said cells which was unsuccessfully transmitted to said host terminal unit.

20. An apparatus for mitigating the temporal distortion effects resulting from bandwidth contention on a multiple access network, said apparatus comprising:

at least one delivery time differential calibration processor for computing for each of a plurality of cells a delivery time differential between an intended transmission time and an actual successful transmission time;

a delivery time differential equalization processor coupled to said calibration processor via said multiple access network;

said calibration processor transmitting each of said cells to said delivery time differential equalization processor; and said delivery time differential equalization processor compensating a temporal distance between each of said cells with said delivery time differential.

21. The apparatus according to claim 20, wherein:

said delivery time differential equalization processor has a set of service class designations for different quality of service and traffic descriptors;

said delivery time differential equalization processor determines a cell release time for each of said cells based on said delivery time differential, a target delivery time differential corresponding to said set of service class designations, and a reference clock time;

said delivery time differential equalization processor inserting each of said cells in a queue associated with said set of service class designations; and said delivery time differential equalization processor releasing each of said cells when each of said cells is at a top of said queue and said cell release time is less than or equal to said clock reference time.

22. The apparatus according to claim 20, wherein a protocol data unit transmitted by said calibration processor includes:

a header portion containing source and destination information;

a payload portion containing said cell information; and said header further including service class information and delivery time differential information, wherein said service class information and said delivery time differential is related.

* * * * *